United States Patent [19]

Regar

[11] Patent Number: 4,815,437

[45] Date of Patent: Mar. 28, 1989

[54] METHOD OF OPERATING AN INTERNAL COMBUSTION ENGINE AND AN INTERNAL COMBUSTION ENGINE DESIGNED FOR CARRYING OUT THIS METHOD

[76] Inventor: Karl-Nikolaus Regar, Rebhuhnweg 3, 8000 München 60, Fed. Rep. of Germany

[21] Appl. No.: 151,433

[22] Filed: Feb. 2, 1988

Related U.S. Application Data

[62] Division of Ser. No. 845,707, Mar. 27, 1986, Pat. No. 4,730,593.

[30] Foreign Application Priority Data

Apr. 3, 1985 [DE] Fed. Rep. of Germany ....... 3512281

[51] Int. Cl.4 .............................................. F02D 23/00
[52] U.S. Cl. ................................. 123/564; 123/559.3; 123/561
[58] Field of Search ............ 60/611; 123/559.1, 559.3, 123/564, 561

[56] References Cited

U.S. PATENT DOCUMENTS

| | | | |
|---|---|---|---|
| 3,180,079 | 4/1965 | Freeman, Jr. | 123/559.1 X |
| 4,519,373 | 5/1985 | Hardy et al. | 123/561 X |
| 4,530,339 | 7/1985 | Oguma et al. | 123/561 |
| 4,589,396 | 5/1986 | Tokushima et al. | 123/559.3 |

FOREIGN PATENT DOCUMENTS

| | | |
|---|---|---|
| 74905 | 3/1983 | European Pat. Off. . |
| 1364249 | 5/1964 | France . |
| 173311 | 9/1985 | Japan . |
| 273042 | 6/1927 | United Kingdom . |

Primary Examiner—Stephen F. Husar
Attorney, Agent, or Firm—Michael J. Striker

[57] ABSTRACT

An internal combustion engine may be driven in the suction mode as well as the supercharging mode. Switchover from the suction to the supercharging mode takes place with the accelerator pedal in a switchover position, and switchback to the suction mode is effected in the return switching position of the accelerator pedal. The switchover and switchback positions are offset with respect to each other with the accelerator pedal in a central position between its initial position and its final position. The arrangement is such that the switchover position is reached at the end of the suction mode at fully open throttle flap (full power position). Upon switchover the throttling of the supercharging flow (throttling begin position) is increased as compared to the end of the suction mode. This throttling of the supercharging is diminished by further actuation of the accelerator pedal in the direction of the final position. Corresponding switchback from the supercharging to the suction mode takes place when the accelerator pedal is in the switchback position at which the drive of the supercharger established by the engine shaft is interrupted and a change is made from the stronger throttling during the supercharging mode to the weaker throttling in the suction mode.

12 Claims, 3 Drawing Sheets

METHOD OF OPERATING AN INTERNAL COMBUSTION ENGINE AND AN INTERNAL COMBUSTION ENGINE DESIGNED FOR CARRYING OUT THIS METHOD

This is a division of application Ser. No. 845,707, filed Mar. 27, 1986, now U.S. Pat. No. 4,730,593.

FIELD OF THE INVENTION

The invention relates to a method of operating an internal combustion engine and to the design of an internal combustion engine with a view to realizing this method.

BACKGROUND OF THE INVENTION

As is well known, the torque generated by an internal combustion engine, such as a 4-stroke engine has a maximum at a certain rotational speed of the engine and drops at increasing as well as decreasing numbers of revolution. The reduced torque in the range of low rotational speeds is disadvantageous especially with motor vehicles because the acceleration is wanting.

Usually a change-speed gear including several transmission stages is provided to displace the engine operation predominantly into a rotational speed range in which the engine still provides a relatively high torque. This useful measure which avoids overdimensioned piston displacement and the correspondingly high fuel consumption, however, solves the problem in part only because the number of transmission stages must be limited in consideration alone of the frequency of shifting. Consequently the problem remains of maintaining the most uniform torque possible within a wider range of rotational speeds.

A known means for influencing the torque of an internal combustion engine, especially also the course of the torque as plotted over the rotational speed of the engine, resides in supercharging the engine. In this case the boost takes care that an increased volume is supplied to the combustion chambers as compared to the suction mode, and this leads to increased performance without any increase in piston displacement. As is well known, this may be influenced also by cam control and thus the duration of the supply phase and its position with respect to the ignition time.

It is known to provide superchargers driven by the engine shaft, and these may either be of the flow type (centrifugal compressors) or of the displacement type (vane cell compressor, Roots blower). Although these mechanical superchargers driven by the engine shaft take up part of the engine output, they have the advantage over the known exhaust gas turbochargers of being able to become effective substantially without any delay in response.

Superchargers usually are driven at a much higher speed of rotation than the engine speed and this makes it necessary to provide a step-up gear between the engine shaft and the supercharger. It is also known with mechanical superchargers of the flow type to employ a gear of variable transmission ratio controlled in response to the rotational speed, for instance by means of a centrifugal governor. In this manner sufficient boost for the desired torque increase may be made available, especially at lower rotational speeds of the engine without requiring any wasteful discharge of boost at higher engine speeds. A corresponding known embodiment, therefore, may be regarded as being suitable in the first place to provide a convenient engine characteristic, especially in respect of the course of the torque in consideration of the rotational speed of the engine without any increase in piston displacement and at low fuel consumption.

It is known to connect a mechanically driven supercharger to the engine shaft by a magnetic clutch so that the supercharger may be switched on in addition rather than operating permanently together with the engine. Even in case of constant running together with the engine the supercharger may be so designed or the boost so controlled by discharge that the boosting effect substantially occurs at those engine speeds at which it is required. However this has the effect of deteriorating the efficiency or increasing the fuel consumption so that switching on of the supercharger, as required, appears to be advantageous.

With the known design including a magnetic clutch between the engine and the supercharger, the supercharger is switched on by way of the accelerator pedal after the latter has been pressed down during the suction mode of the engine until the throttle flap has become fully open. This means that the suction mode is continued up to full power and then an additional supercharging torque is made available by kick-down. However, this supercharging torque cannot be metered or applied differentiated in accordance with the respective rotational speed of the engine. This full switch of additional engine performance caused by the supercharging is not entirely without difficulty. Especially the missing possibility of metering has the effect that a motor vehicle travelling, for instance at full power in the suction mode at a velocity of 180 km/h is accelerated by the torque applied additionally to a velocity of, for example, 220 km/h because it is only at this point that the additional torque is used up by the additional road resistance caused by the velocity. Therefore, it is not possible to travel at a constant velocity of, for instance, 200 km/h.

SUMMARY OF THE INVENTION

It is an object of the instant invention to operate an internal combustion engine, especially a motor vehicle engine of the design mentioned initially and driven alternatingly in the suction and supercharging modes such that harmless, smooth transition into the supercharging mode is obtained and controllable in a manner corresponding to the suction mode. It is another object of the instant invention to achieve the above at low fuel consumption and simple structure.

These objects are met, in accordance with the invention, in that the engine is driven in the suction mode only up to a central position of its control member constituted, for example, by the accelerator pedal, that switchover is effected to the supercharging mode upon reaching of the central position of the control member, that the supercharging flow to the engine is throttled more upon switchover as compared to the throttling at the end of the suction mode, and that further actuation of the control member beyond its central position opens the throttle cross section for the supercharging flow, switchback from the supercharging mode to the suction mode being effected by return of the control member.

Observing these measures provides an additional torque by supercharging the engine in response to the position of the control member or accelerator pedal. This additional torque can be metered by more or less strong actuation of the control member upon reaching of the switchover point. It is especially important in this context that the additional supercharging power does not become effective abruptly at the switchover point because at first the supercharging pressure is largely kept away from the engine by the stronger supercharging throttling as compared to the suction throttling at the switchover point. It is obvious that the supercharging throttling released by the switchover may be so designed that the torque in supercharging operation beginning at the switchover point is substantially the same as the torque generated at the end of the suction mode as the switchover point is reached. This has the effect of a smooth transition from the suction mode to the supercharging mode. Moreover, a limited, relatively small jump in output at the switchover point causes no harm so that control of the supercharging throttling at the switchover point allowing for all different operating conditions may be dispensed with, if desired. Of course, the above statements apply accordingly also to the switchback from the supercharging mode to the suction mode where corresponding wide opening of the suction throttling at the switchback point may be utilized in order to obtain more or less accurate adaptation of the suction performance beginning with the transition into the suction mode to the final performance in the supercharging mode upon reaching of the switchback point.

It is convenient to effect the switchback from the supercharging mode to the suction mode at a control member position which is offset in the direction of the initial position as compared to the control member central position which causes the switchover from the suction to the supercharging mode. The offsetting of the switchover and switchback points which differ by the opposed passing direction of the control member has the effect that a distinct mode of operation, namely suction or supercharging is associated with each position of the control member so that problems caused by uncontrolled multiple changes of the operating mode at practically unvarying position of the control member are excluded.

Thus it is proposed to effect the switchover from the suction mode to the supercharging mode at a control member position within a range of from 55% to 70% and the switchback from the supercharging mode to the suction mode within a range of from 45% to 60% of the total path of adjustment of the control member, based on the initial position thereof. These values at the same time provide an indication of the limits within which the supercharger which consumes part of the engine output should be switched on in order to fulfill the compromise between the desired adaptation of the engine performance to the various operating states and low fuel consumption, in other words to provide the best possible efficiency.

An internal combustion engine corresponding to the above mentioned mode of operation and fulfilling the aim set starts from the known design measures according to which a supercharger of centrifugal compressor type adapted to be driven by the engine shaft through a rotational speed variator having a transmission ratio controlled in response to the rotational speed and connected to the engine shaft by a cutoff clutch, and a throttle flap are provided, the latter being disposed in the intake pipe to the engine and adapted to be shifted by a control member from the closing position into a fully open operating position, the cutoff clutch being operable in response to the position of the control member.

In accordance with the invention the design is such that the throttle flap is adapted to be shifted into its fully open position by a first partial adjustment already of the control member from its initial position into a central switchover position, that the cutoff clutch is operable in the sense of engagement as the switchover position is reached, and that a supercharging throttle means is installed in the pipe connecting the supercharger with the engine and adapted to be opened to a final position by further partial adjustment of the control member from the switchover position, the return movement of the control member causing closing in corresponding manner, first of the supercharging throttle means, and then of the throttle flap, upon having reached a central switchback position at which the cutoff clutch is actuated in the disengaging sense.

An embodiment which allows for these features makes it possible to operate the engine in the manner described above to correspond to the different power requirements during engine operation, at relatively small piston displacement and consequently compact structure, while at the same time keeping low the fuel consumption.

As regards the structural members required and their functions to be fulfilled, there are no technical problems to overcome, all the more so as known control or regulating elements may be resorted to. Likewise unnecessary are any members subject to much wear or high maintenance requirements. A corresponding internal combustion engine including the accessory equipment is suitable even for series manufacture because the corresponding design does not involve any excessive capital investment, a circumstance favoring the use in the motor vehicle industry where the advantages of the invention can be utilized primarily.

A convenient embodiment has the supercharger connected to the intake pipe and the supercharging throttle means formed by the throttle flap disposed in the intake pipe and adjustable between the more open suction position and the more closed supercharging position by an adjusting means which is actuated as the switchover position is reached.

This embodiment proves to be of especially simple structure and requires hardly any additional space. For this reason this particular embodiment is suitable for retrofitting, especially motor vehicles already equipped with a mechanical supercharger. In the interest of the simplest possible installation, moreover it is possible alternatively to pass the suction flow through the supercharger during the suction mode although this leads to some throttling of the intake flow. Or a bypass pipe to the compressor may be provided to be effective during the suction mode and be made ineffective upon transition to the supercharging mode. This avoids circulation of the supercharging flow through the bypass pipe which would reduce the efficiency.

In another convenient embodiment the supercharger is connected to the engine by a supercharging pipe comprising the supercharging throttle means and being separate from the intake pipe which includes the throttle flap. In this case separate throttle members are provided for the suction and supercharging modes and consequently they may remain in their final positions upon switchover into the respective other operating mode (supercharging or suction modes). The final position thus at the same time constitutes the initial position for the renewed transition to the respective other mode of operation. This may simplify the throttling especially in the case of mechanical control.

If the intake and supercharging pipes are discharging in parallel into the engine, of course, care must be taken that the respective pipe not used during one mode does not have any disturbing influence. This is true particularly of the intake pipe during the supercharging mode. For this reason it is useful to associate a close-off means with the intake pipe to be operated as the switchover position is reached. This close-off means, for example, may comprise a shutoff valve controlled by the supercharging pressure prevailing downstream of the supercharging throttle means.

Use may be made also within the limits of the invention of existing possibilities of electronic control already applied with motor vehicle engines as well. Thus it is advantageous to provide the throttle flap and, if desired, also the separately provided supercharging throttle means with an adjusting motor and further to provide an electronic control unit which receives positional signals from the control member and controls the adjusting motor or motors as well as the cutoff clutch. The control unit may receive further signals characteristic of the engine operation, for example from a lambda probe installed in the exhaust gas pipe of the engine. Apart from controlling the throttling it may control also the formation of the mixture or the injection of the fuel so that the engine may operate under optimum conditions whenever possible.

The switchover between the suction and supercharging modes effected in accordance with the invention in response to the position of the control member corresponds best to the requirements normally existing during driving operation. However, there are special situations in which the automatic passing over to the supercharging mode is less useful. If road conditions are difficult and, especially on slippery roads because of ice or snow, too much tractive effort should be avoided if at all possible. For this reason a convenient embodiment comprises a switching means which includes an adjusting member adjustable between a position for the switchover between the suction and supercharging modes in response to the position of the control member and a switchoff position at which the supercharger is switched off permanently. In this manner problematic road conditions can be allowed for by previous adjustment of the mode—mixed suction and supercharging or pure induction operation.

On the other hand, there are conditions under which it seems convenient to render the additional torque obtained by the supercharging available substantially across the entire range of rotational speed of the engine. Such conditions are given, for instance, when driving over mountain passes during which perfect metering of the torque is required in the entire torque range. Thus it is convenient also to provide a switching means which includes an adjusting member adjustable between a position for switchover between the suction and supercharging modes in response to the position of the control member and a constant supercharging position at which the supercharger is driven permanently.

Of course, it is advantageous to combine in one switching means both possibilities, namely the complete switchoff of the supercharger and the constant operation of the same. The adjustment member of this switching means then would be adjustable selectively between the economic normal position for mixed driving operation, the switchoff position for pure induction operation, and the permanent supercharging position for constant supercharging.

In the case of the embodiment for constant supercharging it is convenient to associate a bypass pipe including a close-off means with the supercharger and to subject it to the distributor pressure downstream of the throttle flap such that the close-off means will open by low distributor pressure and cause circulation through the supercharger and the bypass pipe accompanied by boost relief of the supercharger. This design allows for the fact that during constant supercharging, also with the throttle flap closed, such as during idling and particularly in cases of thrust at higher rotational speed of the engine the supercharger would feed fully against the closed throttle flap and build up corresponding pressure, comparable to a pump. Such an operating condition, if it lasted, could damage the supercharger, especially when driving downhill for prolonged times in the first or second gear in the thrust mode. This difficulty is effectively overcome by the opening of the bypass pipe and the resulting relief of the boost controlled by the low distributor pressure.

The advantages of the invention may be utilized with any kind of internal combustion engine provided it is suitable for the suction and supercharging modes. These may be injection engines or carburetor engines. A preferred field of application of the invention relates to 4-stroke engines for installation into motor vehicles.

BRIEF DESCRIPTION OF THE DRAWING

Three embodiments of the invention will be described further with reference to the accompanying drawings, in which.

DESCRIPTION OF THE PREFERRED EMBODIMENTS

Figure 1:
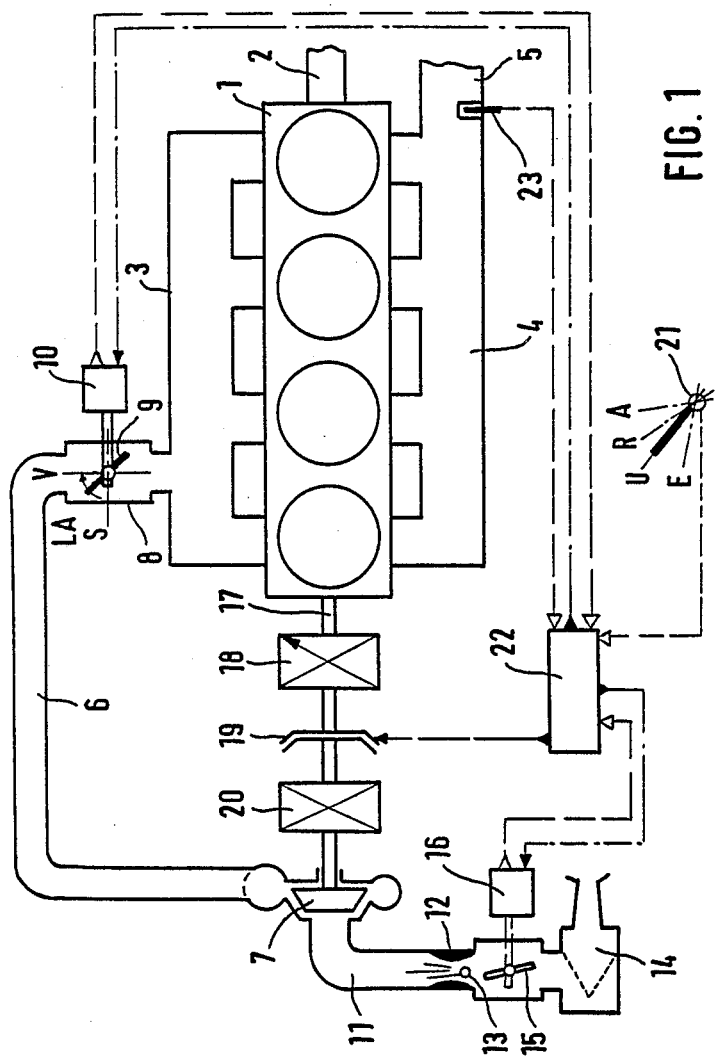
FIG. 1 shows an embodiment including a supercharger installed in the intake pipe and a single throttle flap operated by an adjusting motor for the suction and supercharging modes of a carburetor engine.

As shown in FIG. 1, an engine 1 is provided with four cylinders and includes a drive shaft 2 for driving the wheels. A mixture distributor 3 and an exhaust manifold 4 to which the exhaust pipe 5 is connected are associated in per se known manner with the cylinders of the engine 1.

The intake pipe 6 opens into the mixture distributor 3, and a supercharger 7 of centrifugal compressor type followed by a throttle 8 in the direction of flow and a flap 9 are installed in this pipe. The flap 9 is adjustable by an adjusting motor 10.

To the input of the supercharger 7 or centrifugal compressor a conduit 11 is connected which includes a carburetor 12 to the suction opening 13 of which the fuel supply line is connected. An air filter 14 and a servo flap 15 adjustable by a servo adjusting motor 16 are disposed upstream of the carburetor 12.

The supercharger 7 is driven by an engine shaft 17 which is connected to a rotational speed variator 18 embodied by a looping gear with which the effective diameter of the driving and driven belt pulleys is adjustable in opposite sense and in response to the number of revolutions, for example by centrifugal control. At its output end the rotational speed variator 18 is connected by an electromagnetically operable cutoff clutch 19 to a transmission gear 20 which drives the rotor of the supercharger 7 at higher rotational speed than the rotational speed of the engine shaft 17.

A control member in the form of an accelerator pedal 21 is associated in per se known manner with the engine 1. The respective position of this member is entered into an electronic control unit 22 by a signal line. As shown in the drawing, a lambda probe 23 arranged in the exhaust pipe 5 is connected by another signal line to the control unit 22 which in turn is connected to the adjusting motors 10 and 16 by further signal lines for sensing or adjusting the same. Another signal line coming from the control unit 22 serves for actuation of the cutoff clutch 19.

The arrangement shown in FIG. 1 operates as follows: At the beginning of the engine operation the accelerator pedal 21 is in the initial position A and flap 9 in its horizontal closing position S which is not shown in FIG. 1. The cutoff clutch 19 is disengaged so that the supercharger 7 is not driven and the engine 1, when started, operates in the suction mode. This means that air is drawn in through the air filter 14 and a mixture is formed in the carburetor 12 and flows through the supercharger 7 and the intake pipe 6 to the engine 1 without any boosting effect. Pressing down the pedal 21 will open the flap 9 by means of the control unit 22 and the adjusting motor 10 so that the engine 1 will be powered accordingly. This induction operation is continued until the accelerator pedal 21 reaches the switchover position U which is the position shown in the drawing for the gas pedal and at which the flap 9 has reached its fully open vertical full power position V.

As the switchover position U is reached, the flap 9 at the same time is moved back abruptly into the partly open throttling begin position LA shown in FIG. 1, and the cut-off clutch 19 is engaged so that the supercharger 7 is driven by the engine shaft 17 and operation now is in the supercharging mode. The additional torque made available by the supercharging of for instance 1.4 bars, however, does not become effective because the flap 9 has been moved back only into the partly open position LA at which the engine output in the supercharging mode does not exceed the output supplied in the suction mode with the flap 9 in full power position V, or exceeds the same only slightly. Therefore, the additional supercharger performance is released proportionally in response to the position of the flap 9 which is opened by further adjustment of the accelerator pedal 21 from the switchover position U to the final position E from its supercharging begin position LA once more into the full power position V at which the maximum torque at the respective number of revolutions is obtained, in other words when driving in the full power supercharging mode.

The switchback from the supercharging mode to the suction mode is released by the accelerator pedal 21 which, returning in the direction toward the initial position A, reaches the switchback position R, a circumstance detected by the control unit 22. At this switchback point the cutoff clutch 19 is disengaged and flap 9 is again returned abruptly from its position LA or a somewhat more closed flap position into the full power position V. In this manner a continuous, smooth transition without any noticeable jump in the output of the engine 1 takes place also in passing over from the supercharging mode into the suction mode.

As shown in the drawing, the switchback position R is offset with respect to the switchover position U in the direction of the initial position A, whereby a distinct operating mode (suction or supercharging operation) is associated with every position of the accelerator pedal and minute adjustments of the accelerator pedal 21 such as vibrations do not result in steady switching back and forth between the two operating modes. If, for instance, the path of adjustment of the accelerator pedal 21 from the initial position A to the final position E is 100%, the switchover position U may be provided in the area of 60% and the switchback position R in the area of 50% of the adjusting distance from A to E.

Moreover, it should be noted that the servo flap 15 is adjusted in conventional manner by the servo adjusting motor 16 from the control unit 22 in order to influence the formation of the mixture in the manner desired.

Figure 2:
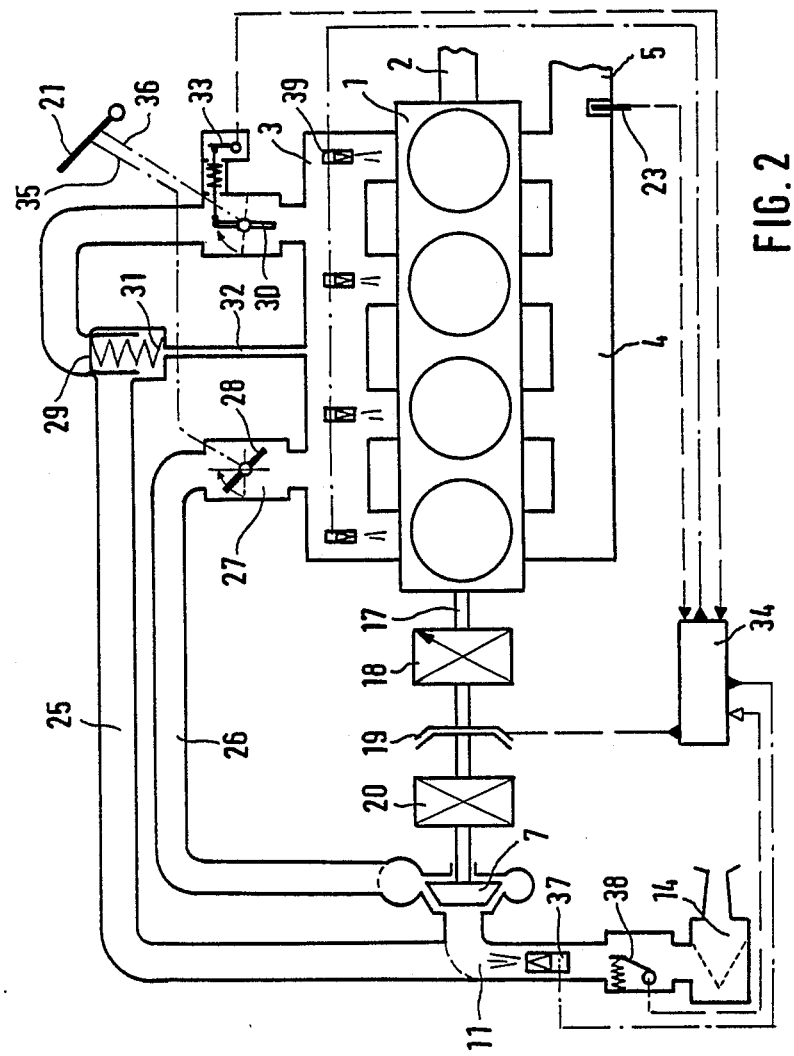
FIG. 2 shows an embodiment including parallel intake and supercharging pipes with their own throttles operated by the accelerator pedal in an injection engine.

The embodiment shown in FIG. 2 does not present a carburetor engine but instead an injection engine 1. Besides, there is a great number of similar or equivalent structural members which are marked by the same reference numerals as in FIG. 1 and thus will not be described again.

Other than in the case of FIG. 1, the supercharger 7 is built into a supercharging pipe 26 which is separate from the intake pipe 25 and provided with its own supercharging throttle means 27 including a flap 28. A close-off means 29 formed by a valve and a throttle flap 30 following the same in the direction of flow are installed in the intake pipe 25. The close-off means 29 is biased into the closing position shown by means of a weak spring 31. The pressure prevailing in the mixture distributor 3 acts through a pressure sensor tube 32 on the close-off means 29 such that low pressure in the distributor 3 will cause the close-off means 29 to overcome the pressure of the spring 31 and move into open position. This assures that the intake pipe 25 is open for flow in the suction mode, while it is blocked in the supercharging mode when pressure is built up in the distributor 3.

An end switch 33 is coordinated with the throttle flap 30 and actuated when the throttle flap 30 reaches the fully open position shown. It passes on the switching operation to a control unit 34 which actuates the cutoff clutch 19. The flap 28 and the throttle flap 30 are not actuated by means of the control unit 34 but instead directly from the accelerator pedal 21 by mechanical links 35 and 36, respectively, as indicated. The presentation of the accelerator pedal 21 in FIG. 2 corresponds to switchover position U in FIG. 1 at which the throttle flap 30 is in the fully open position corresponding to the full power position V, and flap 28 is partly open, corresponding to the supercharging begin position LA. The links 35 and 36 are so designed and connected to the accelerator pedal 21 that the pedal can be pressed down further into a final position whereby the flap 28 is opened until it reaches a fully open position, while the throttle flap 30 remains in the fully open position until the switchback position is reached by return of the accelerator pedal 21. In this position the flap 28 will have reached the position shown or a somewhat more closed position and the throttle flap 30 receives a first closing movement leading to renewed actuation of the end switch 33 and thus to the disengagement of the cut-off clutch 19.

As shown in the drawing, the intake pipe 25 and the supercharging pipe 26 with the supercharger 7 are branched off in parallel from the conduit 11 in which there is a central injection nozzle 37 and an air meter 38. In the area of the distributor 3 individual injection nozzles 39 are associated with the individual cylinders.

Control unit 34 controls the injection of the fuel in response to the air meter 38 and the values measured by the lambda probe 23. The injection in the suction mode is effected through the individual injection nozzles, whereas the injection nozzle 37 is used for central injection in the supercharging mode. In this event the downstream supercharger 7 driven by the engine shaft 17 warrants good turbulence or formation of the mixture.

The mode of operation of the arrangement shown in FIG. 2 corresponds to that of the arrangement according to FIG. 1. However, because of the separate flaps 28 and 30 for the supercharging and suction modes the sudden closing or opening of a flap at the points of switchover or switchback does not occur. The mechanical coupling of the flaps 28 and 30 with the accelerator pedal 21 also does away with flap control by means of the control unit 34. The embodiment shown in FIG. 3 relates to an injection engine 1 of largely similar design as the one shown in FIG. 1 so that corresponding reference numerals were used again and the description below will be limited to the modifications given.

Figure 3:
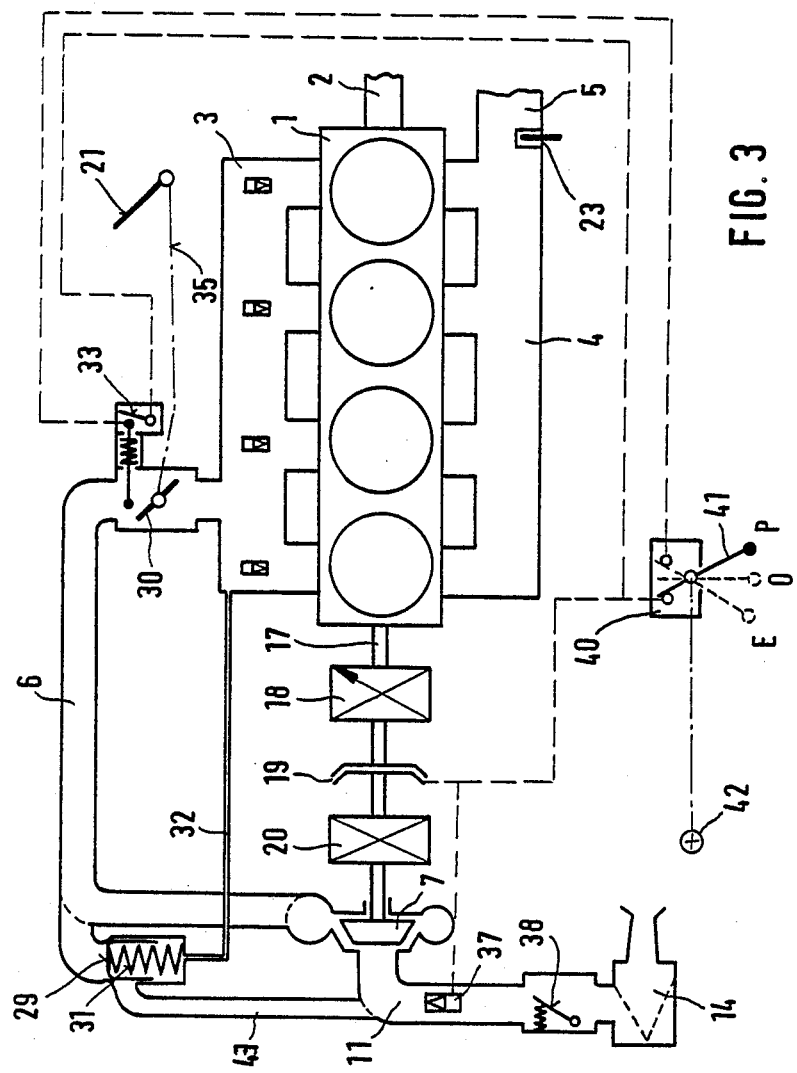
FIG. 3 shows an embodiment without a separate supercharging pipe but with a bypass pipe associated with the supercharger and a switching means for the selective mixed mode, pure suction mode, and constant supercharging mode.

According to FIG. 3 the accelerator pedal 21 acts mechanically on the only throttle flap 30 which closes the end switch 33 when almost entirely open. A switching means 40 including an adjusting member 41 is connected to a storage battery 42, the end switch 33, and by a common line to the cutoff clutch 19 and the central injection nozzle 37. Also the end switch 33 is in connection with this common line.

As shown in the drawing, the adjusting member 41 has three switching positions. In the position P (power) shown, it constantly connects the storage battery with the cutoff clutch 19 so that the supercharger always remains switched on, regardless of the position of the accelerator pedal 21.

When the adjusting member 41 is in the position E (economy), the direct connection between the storage battery 42 and the cutoff clutch 19 is interrupted and can be established only by the end switch 33. This is the position for mixed operation at which the supercharger 7 is switched on or off in response to the position of the accelerator pedal 21.

When adjusting member 41 is in the position O, the three contact terminals of the switching means 40 are separated so that the cutoff clutch 19 interrupts the driving connection between the engine shaft 17 and the supercharger 7 and the engine 1 consequently operates in the suction mode only.

A bypass pipe 43 is associated with the supercharger 7 to connect the conduit 11 with the intake pipe 6. A close-off means 29 and a spring 31 are installed in the bypass pipe 43 and connected to the mixture distributor 3 by a pressure sensor tube 32. This design and arrangement correspond substantially to what is shown in FIG. 2.

In the supercharging mode the supercharger 7 feeds pressurized air through the pipe 6 and the open throttle flap 30 to the mixture distributor 3. Then the high pressure building up in the mixture distributor 3 acts through the pressure sensor tube 32 to close the close-off means 29 so that the supercharging operation is not affected by the bypass pipe 43.

If the accelerator pedal 21 subsequently is taken back with the adjusting member 41 in position E, the end switch 33 is opened and the current supply to the cutoff clutch 19 interrupted, whereby the supercharger is turned off. Now low pressure will be developed in the mixture distributor 3 and the close-off means 29 is opened against the pressure of spring 31. The engine 1 thus will draw in air through the bypass pipe 43 as well as through the supercharger 7.

In the supercharging mode and with substantially closed throttle flap 30, an operating condition which may happen with the adjusting member in P position, the close-off means 29 opens under the effect of the low pressure in the mixture distributor 3 which acts through the pressure sensor tube 32. This causes relief of the supercharger 7 and, at the same time, a revolving flow takes place through the supercharger 7 and the bypass pipe 43.

What is claimed is:

1. In a method of operating an internal combustion engine, specifically an Otto engine for a power vehicle, which can run in a suction operation mode or in a supercharge operation mode by means of a supercharger driven by said engine the method comprising the steps of providing switchover means (21, 22 19; 21, 33, 34, 19) for switching the engine between a suction operation mode (A-U, R-A) and supercharge operation mode (U-E, E-R) and providing at least one throttle flap (9; 28, 30) and continually adjusting by said flap an engine torque in said suction operation mode and said supercharge operation mode, the improvement comprising utilizing a centrifugal compressor as said supercharger, providing a speed variator (18) for driving said supercharger, and providing a supercharge pressure throttling relative to said engine downstream of said supercharger in a supercharge line (6; 26), wherein the supercharging flow to the engine is throttled more upon switchover as compared to the throttling at the end of the suction operation mode, running said engine (1) in said suction operation mode (A-U) to a middle position (U) of a gas pedal (21), switching on the supercharger (7) when said middle position is reached and thereby switching to the supercharge operation mode (U-E) by operating the gas pedal (21) further over the middle position (U) to adjust said throttle flap (9; 28) for adjusting supercharge pressure, and by returning said gas pedal causing switching-off said supercharger (7) to a middle gas pedal position (R) to switchover said engine to the suction operation mode (R-A).

2. The method as defined in claim 1, wherein the engine torque in the suction operation mode (A-U, R-A) and the supercharge operation mode (U-E, E-R) is adjusted by the same throttle flap (9) which during the switchover to the supercharge operation mode (U-E) is set from an open suction position (V) to a more closed supercharge position (LA) and during the switchover to the suction operation mode (R-A) is reset from the supercharge position to the more open suction position.

3. The method as defined in claim 1, wherein the engine torque in the supercharge operation mode (U-E, E-R) and the suction operation mode (A-U, R-A) is adjusted by two different throttle flaps (28, 30) which during the switchover between two operation modes have respectively different throttle angle positions.

4. The method as defined in claim 3, wherein the switchover from the supercharge operation mode (E-R)

to the suction operation mode (R-A) is obtained at a gas pedal position (R) which is shifted relative to the gas pedal position (U) at the switchover from the suction operation mode (A-U) to the supercharge operation mode (U-E) in the direction to the initial position (A) of the gas pedal.

5. The method as defined in claim 4, wherein the switchover from the suction operation mode (A-U) to the supercharge operation mode (U-E) at a gas pedal position (U) is within a range 55% to 70% and the switchover from the supercharge operation mode (E-R) to the suction operation mode (R-A) at a gas pedal position (R) is within a range 45% to 60% of an entire adjustment path (A to E) of the gas pedal (21) from the initial position (A) thereof.

6. A device for operating an internal combustion engine, specifically an Otto engine for a power vehicle, which can run in a suction operation mode or in a supercharge operation mode by means of a supercharger driven by said engine, the device comprising switchover means (21, 22, 19; 21, 33, 34, 19) for switching the engine between a suction operation mode (A-U, R-A) and supercharge operation mode (U-E, E-R); at least one throttle flap (9; 28, 30) for continually adjusting an engine torque in said suction operation mode and said supercharge operation mode; said supercharger being formed by a centrifugal compressor; a speed variator (18) for driving said supercharger; a supercharge line (6; 26), said throttle flap being positioned in said supercharge line, the engine having a shaft (17); said switchover means including said flap, a gas pedal and a cutoff clutch (19) interconnected between said shaft and said supercharger (7), said throttle flap (9; 30) being adjustable by said gas pedal (21) within the suction operation range (A-U, R-A) and within the supercharge operation range (U-E, E-R), wherein the arrangement is such that the supercharging flow to the engine is throttled more upon switchover as compared to the throttling at the end of the suction operation range.

7. The device as defined in claim 6, wherein said switchover means (21, 22, 19; 21, 33, 34, 19) is actuated by the gas pedal in dependence upon a position (U, R) thereof.

8. The device as defined in claim 7, wherein a single throttle flap (9) in a single supercharge line (6) is provided for both operation modes; and further including at least one adjusting motor (10) connected to said throttle flap for adjusting said flap during switchover to the supercharge operation mode from an open suction position (V) to a more closed supercharge position (LA) and during switchover to the suction operation mode from a supercharge position to a more open suction position.

9. The device as defined in claim 7, further including a suction line (25) and a second throttle flap (30) positioned in said suction line, said suction line being separated from said supercharge line (26) with said first one throttle flap (28), said first throttle flap and said second throttle flap being adjustable by the gas pedal (21) independently from each other within a respective operation mode range (U-E, E-R or A-U, R-A), the first throttle flap (28) being in a more closed position than the second throttle flap (30) when reaching the switchover positions (U, R).

10. The device as defined in claim 9, further including close-off means (99) positioned in said suction line (25) and closing the suction line upon switchover to the supercharge operation mode and opening said suction line upon switchover to said suction operation mode.

11. The device as defined in claim 6, wherein said close-off means (29) is controlled by supercharge pressure downstream of said first throttle flap (28) adjustable within the supercharge operation range (U-E, E-R).

12. The device as defined in claim 6; further including an electronic control device (22) which receives a signal from the gas pedal (21) and controls at least one adjusting motor (10) for said throttle flap (9) and said cutoff clutch.

* * * * *